United States Patent
Chaskar et al.

(10) Patent No.: US 7,440,434 B2
(45) Date of Patent: Oct. 21, 2008

(54) METHOD AND SYSTEM FOR DETECTING WIRELESS ACCESS DEVICES OPERABLY COUPLED TO COMPUTER LOCAL AREA NETWORKS AND RELATED METHODS

(75) Inventors: Hemant Chaskar, Chelmsford, MA (US); Murthy Jonnalagadda, Pune (IN); Sharad Mittal, Delhi (IN); Pravin Bhagwat, Kendall Park, NJ (US)

(73) Assignee: AirTight Networks, Inc., Mountain View, CA (US)

( * ) Notice: Subject to any disclaimer, the term of this patent is extended or adjusted under 35 U.S.C. 154(b) by 712 days.

(21) Appl. No.: 11/026,960

(22) Filed: Dec. 29, 2004

(65) Prior Publication Data
US 2005/0195753 A1 Sep. 8, 2005

Related U.S. Application Data

(60) Provisional application No. 60/607,897, filed on Sep. 8, 2004, provisional application No. 60/543,631, filed on Feb. 11, 2004.

(51) Int. Cl.
*H04L 12/28* (2006.01)
(52) U.S. Cl. .......................... 370/338; 370/389; 726/23
(58) Field of Classification Search ........................ None
See application file for complete search history.

(56) References Cited

U.S. PATENT DOCUMENTS 5,987,611 A 11/1999 Freund (Continued)

FOREIGN PATENT DOCUMENTS

GB 2389483 A 12/2003

(Continued)

OTHER PUBLICATIONS

Bellardo et al., Denial-of-Service Attacks: Real Vulnerabilities and Practical Solutions, Department of Computer and Science Engineering, University of California at San Diego, Proceedings of the USENIX Security Symposium, Washington, DC, Aug. 2003.

(Continued)

*Primary Examiner*—Robert W Wilson
(74) *Attorney, Agent, or Firm*—Hemant M. Chaskar

(57) ABSTRACT

A system and method is provided for detecting wireless access devices coupled to local area network of computers. The method includes coupling a sniffer device to a local area network. The method includes transferring one or more packets to be directed to a selected device over the local area network. The selected device is preferably coupled to the local area network. The method includes intercepting the one or more packets to be directed to the selected device at the sniffer device. Moreover, the method includes deriving information from the intercepted one or more packets using the sniffer device. The method can generate one or more marker packets in a selected format using the sniffer device. The marker packets are provided based upon at least a portion of the information derived from the intercepted packets. The method includes transferring the one or more marker packets from the sniffer device over the local area network to the selected device and monitoring an airspace within a vicinity of the selected device using one or more sniffer devices.

17 Claims, 9 Drawing Sheets

U.S. PATENT DOCUMENTS

| | | | |
|---|---|---|---|
| 6,618,355 | B1 | 9/2003 | Gulliford et al. |
| 6,647,418 | B1 | 11/2003 | Maria et al. |
| 6,701,432 | B1 | 3/2004 | Deng et al. |
| 6,728,670 | B2 | 4/2004 | Schenkel et al. |
| 6,735,702 | B1 | 5/2004 | Vavatkar et al. |
| 6,745,333 | B1 | 6/2004 | Thomsen |
| 6,753,702 | B2 | 6/2004 | Mizuno et al. |
| 6,754,488 | B1 | 6/2004 | Won et al. |
| 6,897,776 | B1 | 5/2005 | Haycraft |
| 6,957,067 | B1 | 10/2005 | Iyer et al. |
| 7,002,943 | B2 * | 2/2006 | Bhagwat et al. ............. 370/338 |
| 7,042,852 | B2 | 5/2006 | Hrastar |
| 7,058,796 | B2 | 6/2006 | Lynn et al. |
| 7,127,524 | B1 * | 10/2006 | Renda et al. ................. 709/245 |
| 7,154,874 | B2 * | 12/2006 | Bhagwat et al. ............. 370/338 |
| 7,154,888 | B1 * | 12/2006 | Li et al. ...................... 370/389 |
| 7,216,365 | B2 * | 5/2007 | Bhagwat et al. ............... 726/23 |
| 7,257,107 | B2 | 8/2007 | Swier et al. |
| 7,277,404 | B2 | 10/2007 | Tanzella et al. |
| 7,316,031 | B2 | 1/2008 | Griffith et al. |
| 7,339,914 | B2 * | 3/2008 | Bhagwat et al. ............. 370/338 |
| 7,340,768 | B2 | 3/2008 | Rosenberger |
| 7,346,065 | B2 * | 3/2008 | Kobayashi .................. 370/401 |
| 7,383,577 | B2 | 6/2008 | Hrastar et al. |
| 2001/0052014 | A1 | 12/2001 | Sheymov et al. |
| 2002/0143935 | A1 | 10/2002 | Schenkel et al. |
| 2003/0051032 | A1 | 3/2003 | Schenkel et al. |
| 2003/0051167 | A1 | 3/2003 | King et al. |
| 2003/0126468 | A1 | 7/2003 | Markham |
| 2003/0135762 | A1 | 7/2003 | Macaulay |
| 2003/0149891 | A1 | 8/2003 | Thompsen |
| 2003/0161265 | A1 | 8/2003 | Cao et al. |
| 2003/0167405 | A1 | 9/2003 | Freund et al. |
| 2003/0185244 | A1 | 10/2003 | Wu et al. |
| 2003/0186679 | A1 | 10/2003 | Challener et al. |
| 2003/0188012 | A1 * | 10/2003 | Ford ........................... 709/238 |
| 2003/0217283 | A1 | 11/2003 | Hrastar et al. |
| 2003/0217289 | A1 | 11/2003 | Ammon et al. |
| 2003/0219008 | A1 | 11/2003 | Hrastar |
| 2003/0221006 | A1 | 11/2003 | Kuan et al. |
| 2003/0229703 | A1 | 12/2003 | Falola et al. |
| 2003/0232598 | A1 | 12/2003 | Aljadeff et al. |
| 2003/0233567 | A1 | 12/2003 | Lynn et al. |
| 2003/0236990 | A1 | 12/2003 | Hrastar et al. |
| 2004/0003285 | A1 | 1/2004 | Whelan et al. |
| 2004/0008652 | A1 | 1/2004 | Tanzella et al. |
| 2004/0023640 | A1 | 2/2004 | Ballai |
| 2004/0028017 | A1 | 2/2004 | Whitehill |
| 2004/0047356 | A1 * | 3/2004 | Bauer ......................... 370/401 |
| 2004/0049699 | A1 | 3/2004 | Griffith et al. |
| 2004/0078151 | A1 | 4/2004 | Aljadeff et al. |
| 2004/0078717 | A1 | 4/2004 | Allred et al. |
| 2004/0098485 | A1 | 5/2004 | Larson et al. |
| 2004/0098610 | A1 | 5/2004 | Hrastar |
| 2004/0103282 | A1 | 5/2004 | Meier et al. |
| 2004/0107219 | A1 | 6/2004 | Rosenberger |
| 2004/0111640 | A1 | 6/2004 | Baum |
| 2004/0143751 | A1 | 7/2004 | Peikari |
| 2004/0157624 | A1 | 8/2004 | Hrastar |
| 2004/0203764 | A1 | 10/2004 | Hrastar et al. |
| 2004/0209617 | A1 | 10/2004 | Hrastar |
| 2004/0209634 | A1 | 10/2004 | Hrastar |
| 2004/0210654 | A1 | 10/2004 | Hrastar |
| 2004/0215972 | A1 | 10/2004 | Sung et al. |
| 2004/0218602 | A1 | 11/2004 | Hrastar |
| 2005/0025182 | A1 | 2/2005 | Nazari |
| 2005/0030929 | A1 | 2/2005 | Swier et al. |
| 2005/0039047 | A1 | 2/2005 | Raikar |
| 2005/0042999 | A1 | 2/2005 | Rappaport |
| 2005/0050365 | A1 | 3/2005 | Seki et al. |
| 2005/0094568 | A1 | 5/2005 | Judd |
| 2005/0094630 | A1 | 5/2005 | Valdevit |
| 2005/0111460 | A1 | 5/2005 | Sahita |
| 2005/0114700 | A1 | 5/2005 | Barrie et al. |
| 2005/0174961 | A1 | 8/2005 | Hrastar |
| 2005/0226195 | A1 * | 10/2005 | Paris et al. ................... 370/338 |
| 2005/0259611 | A1 | 11/2005 | Bhagwat et al. |
| 2006/0123133 | A1 | 6/2006 | Hrastar |
| 2006/0235735 | A1 | 10/2006 | Sagfors et al. |
| 2007/0094741 | A1 | 4/2007 | Lynn et al. |
| 2007/0189290 | A1 | 8/2007 | Bauer |

FOREIGN PATENT DOCUMENTS

| | | |
|---|---|---|
| WO | 0193531 A2 | 6/2001 |
| WO | 2004019559 A3 | 3/2004 |
| WO | 2004028121 A2 | 4/2004 |
| WO | 2004059912 A1 | 7/2004 |
| WO | 2004095192 A2 | 11/2004 |

OTHER PUBLICATIONS

Lim et al., Wireless Intrusion Detection and Response, IEEE., Proceedings of the 2003 IEEE Workshop on Information Assurance United States Military Academy, West Point, NY, Jun. 2003.

Chirumamilla et al., Agent based intrusion detection and response system for wireless LANs, IEEE International Conference on Communications (ICC), May 11-15, 2003, pp. 492-496, vol. 1.

Korba et al., Security system for wireless local area networks, Personal, Indoor and Mobile Radio Communications, Sep. 8-11, 1998, pp. 1550-1554, vol. 3, Boston, USA.

Zhang et al., Intrusion detection techniques for mobile wireless networks, Wireless Networks, Sep. 2003, pp. 545-556, vol. 9, issue 3.

Yang et al., Intrusion detection solution to WLANs, Software Base, Civil Aviation University of China, Tianjin, China, IEEE 6th Circuits and Systems (CAS) Symposium on Emerging Technologies: Mobile and Wireless Communication, Shanghai, China, May 31-Jun. 2, 2004, vol. 2, pp. 553-556.

Hatami et al., In-Building Intruder Detection for WLAN Access, Center for Wireless Information Network Studies, Worcester Polytechnic Institute (WPI), MA, USA, 2004 Position Location and Navigation Symposium, Apr. 26-29, 2004, pp. 592-597.

Yeo et al., A Framework for Wireless LAN Monitoring and Its Applications, Proceedings of the 2004 ACM workshop on Wireless security, Oct. 1, 2004, pp. 70-79.

International Search Report, International Application No. PCT/US06/16364.

* cited by examiner

METHOD AND SYSTEM FOR DETECTING WIRELESS ACCESS DEVICES OPERABLY COUPLED TO COMPUTER LOCAL AREA NETWORKS AND RELATED METHODS

CROSS-REFERENCES TO RELATED APPLICATIONS

This present application claims priority to the U.S. Provisional Application No. 60/543,631, titled "An Automated Method and an RF Sensor System for Wireless Unauthorized Transmission, Intrusion Detection and Prevention," filed on Feb. 11, 2004, and the U.S. Provisional Application No. 60/607,897, titled "Automated method and system for detecting unauthorized devices in wireless local area computer networks", filed on Sep. 8, 2004; commonly assigned, and each of which is hereby incorporated by reference for all purposes.

The present invention also relates to U.S. application Ser. No. 10/931,585, filed on Aug. 31, 2004 and U.S. application Ser. No. 10/931,926, filed on Aug. 31, 2004; commonly assigned, and each of which is hereby incorporated by reference for all purposes.

BACKGROUND OF THE INVENTION

The present invention relates generally to wireless computer networking techniques. In particular, the invention provides methods and systems for intrusion detection for local area networks with wireless extensions. More particularly, the invention provides methods and systems for testing connectivity of certain devices coupled to local area networks for wireless transmission. The present intrusion detection can be applied to many computer networking environments, e.g., environments based upon the IEEE 802.11 family of standards (WiFi), Ultra Wide Band (UWB), IEEE 802.16 (WiMAX), Bluetooth, and others.

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic area (e.g., an office, building floor, building, home, or any other defined geographic region (indoor and/or outdoor)) are typically interconnected using a Local Area Network (LAN) (e.g., the Ethernet). The LANs, in turn, can be interconnected with each other using a Wide Area Network (WAN) (e.g., the Internet). A conventional LAN can be deployed using an Ethernet-based infrastructure comprising cables, hubs switches, and other elements.

Connection ports (e.g., Ethernet ports) can be used to couple multiple computer systems to the LAN. For example, a user can connect to the LAN by physically attaching a computing device (e.g., a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g., file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. The IEEE 802.11 family of standards (WiFi) is a common standard for such wireless communication. In WiFi, the 802.11b standard provides for wireless connectivity at speeds up to 11 Mbps in the 2.4 GHz radio frequency spectrum; the 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP.

In the past, security of the computer network has focused on controlling access to the physical space where the LAN connection ports are located. The application of wireless communication to computer networking can introduce additional security exposure. Specifically, the radio waves that are integral to wireless communication often cannot be contained in the physical space bounded by physical structures, such as the walls of a building.

Hence, wireless signals often "spill" outside the area of interest. Because of this spillage, unauthorized users, who could be using their stations in a nearby street, parking lot, or building, could wirelessly connect to the AP and thus gain access to the LAN. Consequently, providing conventional security by controlling physical access to the connection ports of the LAN would be inadequate.

To prevent unauthorized access to the LAN over WiFi, the AP can employ certain techniques. For example, in accordance with 802.11, a user is currently requested to carry out an authentication handshake with the AP (or a WiFi switch that resides between the AP and the existing LAN) before being able to connect to the LAN. Examples of such handshake are Wireless Equivalent Privacy (WEP) based shared key authentication, 802.1x based port access control, and 802.11i based authentication. The AP can provide additional security measures such as encryption and firewalls.

Despite these measures, security risks still exist. For example, an unauthorized AP may connect to the LAN and then, in turn, allow unauthorized users to connect to the LAN. These unauthorized users can thereby access proprietary/trade secret information on computer systems connected to the LAN without the knowledge of the owner of the LAN. Notably, even if the owner of the LAN enforces no WiFi policy (i.e., no wireless extension of the LAN allowed at all), the threat of unauthorized APs still exists.

Therefore, a need arises for a system and technique that improves security for LAN environments.

BRIEF SUMMARY OF THE INVENTION

According to the present invention, techniques related to wireless computer networking are provided. In particular, the invention provides methods and systems for intrusion detection for local area networks with wireless extensions. More particularly, the invention provides methods and systems for testing connectivity of certain devices coupled to local area networks for wireless transmission. In a specific embodiment, the present invention provides for detecting unauthorized wireless access points that are coupled to the local area network. The present intrusion detection can be applied to many computer networking environments, e.g., environments based upon the IEEE 802.11 family of standards (WiFi), Ultra Wide Band (UWB), IEEE 802.16 (WiMAX), Bluetooth, and others.

The application of wireless communication to computer networking has introduced significant security risks according to certain examples. For example, the radio waves that are integral to wireless communication can "spill" outside a region within which local area computer network is operated (e.g., office space, building, etc.). Unfortunately, unauthorized wireless devices can detect this "spillage". Additionally, unauthorized wireless devices can surreptitiously operate within the local area network. These devices can pose serious security threats to the network due to their signal spillage. Therefore, as computer networks with wireless extensions become more ubiquitous, users are increasingly concerned about unauthorized wireless devices, whether within or outside the region of operation of the local area network.

In accordance with one aspect of the invention, a method is provided for detecting wireless access devices coupled to local area network of computers. The method includes coupling (e.g., directly connecting via physical connection or socket) a sniffer device to a local area network. The method includes transferring one or more packets to be directed to a selected device over the local area network. Preferably, transferring is provided from a certain source device. The selected device is preferably coupled to the local area network. The method includes intercepting the one or more packets to be directed to the selected device at the sniffer device. Preferably, the step of intercepting occurs before the packets reach the selected device. Moreover, the method includes deriving information from the intercepted one or more packets using the sniffer device. The method can generate one or more packets in a selected format using the sniffer device. The generated one or more packets are provided based upon at least a portion of the information derived from the intercepted packets. The method includes transferring the one or more packets in the selected format from the sniffer device over the local area network to the selected device, and also includes monitoring an airspace within a vicinity of the selected device using one or more sniffer devices.

In accordance with another aspect of the invention, sniffer device is provided. The sniffer device can be provided at least in part in computer hardware, firmware, software or combination thereof. The sniffer device comprises a handler adapted to intercept one or more packets on a network segment. Preferably, the one or more packets are directed to be transferred to a selected device coupled to the network segment. The sniffer device comprises a processor adapted to derive information associated with the intercepted one or more packets. Moreover, the sniffer device includes a packet generator adapted to generate one or more packets in a selected format. The generated one or more packets are constructed based upon at least a portion of the information derived from the intercepted packets. The sniffer device also comprises an output handler adapted to transfer the one or more packets in the selected format over the network segment to the selected device.

Various other methods and systems are also provided throughout the present specification including a way for detecting wireless access devices coupled to computer local area networks.

Certain advantages and/or benefits may be achieved using the present invention. For example, the present technique provides an easy to use process that relies upon conventional computer hardware and software technologies. In some embodiments, the method and system are fully automated and can be used to prevent unauthorized wireless access to local area computer networks. The automated operation minimizes the human effort required during the system operation and improves the system response time and accuracy. In some embodiments, the method and system can advantageously reduce the false positives on intrusion events thereby eliminating the nuisance factor during the system operation. This is because the technique of the invention intelligently distinguishes between harmful APs and friendly neighbor's APs, the latter usually being the source of false positives. Depending upon the embodiment, one or more of these benefits may be achieved. These and other benefits will be described in more throughout the present specification and more particularly below.

DETAILED DESCRIPTION OF THE INVENTION

According to the present invention, techniques related to wireless computer networking are provided. In particular, the invention provides methods and systems for intrusion detection for local area networks with wireless extensions. More particularly, the invention provides methods and systems for testing connectivity of certain devices coupled to local area networks for wireless transmission. The present intrusion detection can be applied to many computer networking environments, e.g., environments based upon the IEEE 802.11 family of standards (WiFi), Ultra Wide Band (UWB), IEEE 802.16 (WiMAX), Bluetooth, and others.

Conventional security of a computer network has focused on controlling access to the physical space where the local area network (LAN) connection ports are located. The application of wireless communication to computer networking has introduced new security risks. Specifically, the radio waves that are integral to wireless communication often cannot be contained within the physical boundaries of the region of operation of a local area network (e.g., an office space or a building). This "spillage" can be detected by unauthorized wireless devices outside the region of operation. Additionally, unauthorized wireless devices can be operating within the local area network, and can even be connected to the local area network. The radio coverage of such devices that spills outside the region of operation can be used by devices outside the region to gain unauthorized access to the local area network. As computer networks with wireless extensions become more ubiquitous, users are increasingly concerned about unauthorized wireless devices, whether within or outside the region of operation of the local area network.

Figure 1:
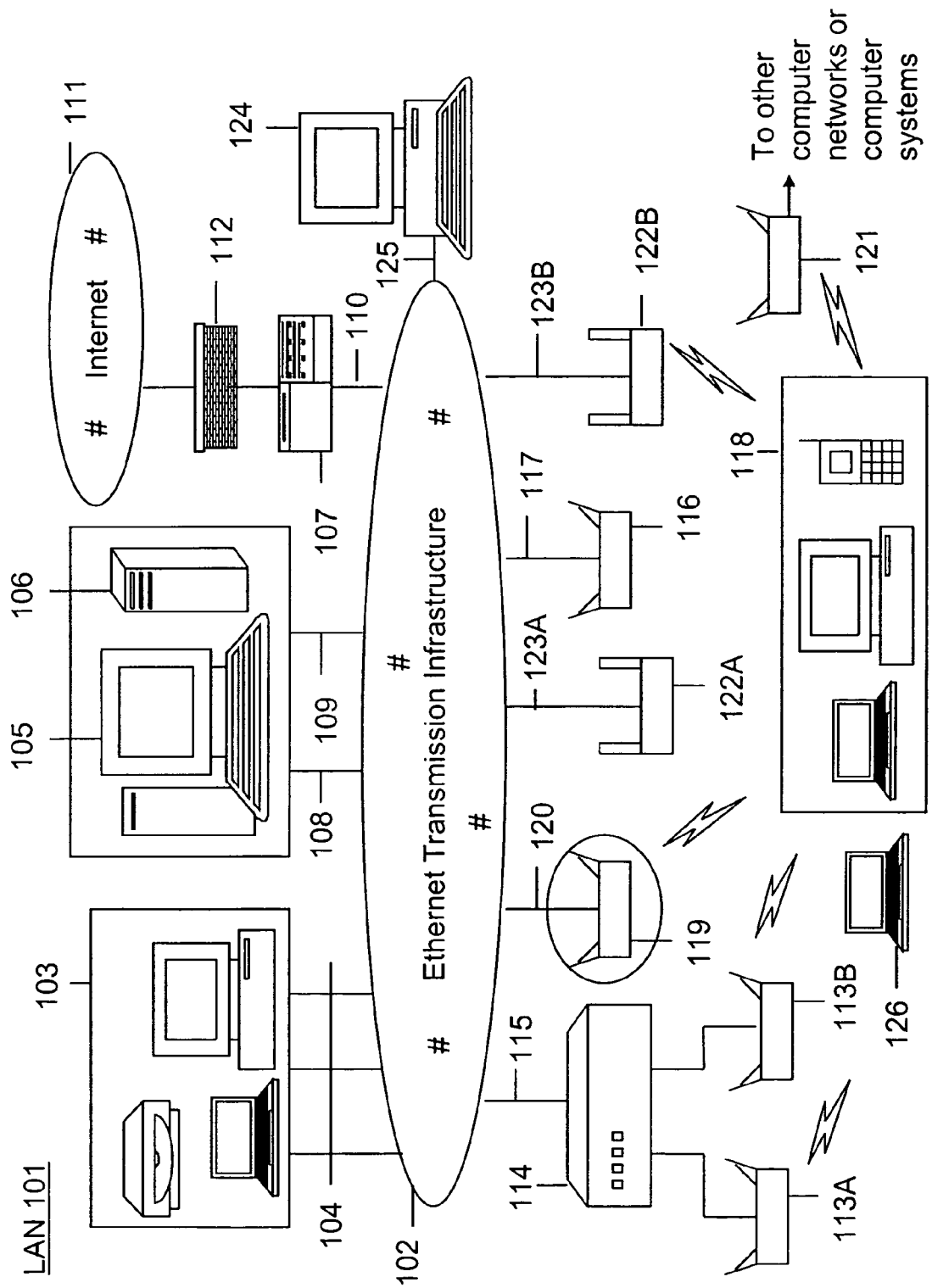
FIG. 1 illustrates a simplified LAN architecture that can facilitate intrusion detection according to an embodiment of the present invention.

FIG. 1 illustrates a simplified local area network (LAN) 101 that can facilitate security monitoring. This diagram is merely an example, which should not unduly limit the scope of the claims herein. One of ordinary skill in the art would recognize many variations, modifications, and alternatives. In LAN 101, core transmission infrastructure 102 can include various transmission components, e.g., Ethernet cables, hubs, and switches. In a typical deployment, the core transmission infrastructure 102 can comprise one or more network segments.

According to one embodiment, a network segment refers to an Internet Protocol or IP "subnetwork" (called "subnet"). Each subnet is identified by a network number (e.g., IP number and subnet mask) and plurality of subnets are interconnected using router devices. In an alternative embodiment, a network segment can refer to a virtual local area network (VLAN) segment and plurality of VLANs can be interconnected using switches (e.g., Ethernet switches). Other embodiments of network segments are also possible. Notably, plurality of network segments of LAN 101 can be geographically distributed (e.g., in offices of a company in different geographic locations). The geographically distributed segments can be interconnected using virtual private network (VPN).

One or more connection ports (e.g., Ethernet sockets) are provided on each of the segments for connecting various computer systems to the LAN 101. Thus, one or more end user devices 103 (such as desktop computers, notebook computers, telemetry sensors, etc.) can be connected to LAN 101 via one or more connection ports 104 using wires (e.g., Ethernet cables) or other suitable connection means.

Other computer systems that provide specific functionalities and services can also be connected to LAN 101. For example, one or more database computers 105 (e.g., computers storing customer accounts, inventory, employee accounts, financial information, etc.) may be connected to LAN 101 via one or more connection ports 108. Additionally, one or more server computers 106 (computers providing services, such as database access, email storage, HTTP proxy service, DHCP service, SIP service, authentication, network management, etc.) may be connected to LAN 101 via one or more connection ports 109.

In this embodiment, a router 107 can be connected to LAN 101 via a connection port 110. Router 107 can act as a gateway between LAN 101 and the Internet 111. Note that a firewall/VPN gateway 112 can be used to connect router 107 to the Internet 111, thereby protecting computer systems in LAN 101 against hacking attacks from the Internet 111 as well as enabling remote secure access to LAN 101.

In this embodiment, a wireless extension of LAN 101 is also provided. For example, authorized APs 113A and 113B can be connected to LAN 101 via a switch 114. Switch 114 in turn can be connected to a connection port 115. Switch 114 can assist APs 113A and 113B in performing certain complex procedures (e.g., procedures for authentication, encryption, QoS, mobility, firewall, etc.) as well as provide centralized management functionality for APs 113A and 113B. Note that an authorized AP 116 can also be directly connected to LAN 101 via a connection port 117. In this case, AP 116 may perform necessary security procedures (such as authentication, encryption, firewall, etc.) itself.

In this configuration, one or more end user devices 118 (such as desktop computers, laptop computers, handheld computers, PDAs, etc.) equipped with radio communication capability can wirelessly connect to LAN 101 via authorized APs 113A, 113B, and 116. Notably, authorized APs connected to the LAN 101 provide wireless connection points on the LAN. Note that WiFi or another type of wireless network format (e.g., UWB, WiMax, Bluetooth, etc.) can be used to provide the wireless protocols.

As shown in FIG. 1, an unauthorized AP 119 can also be connected to LAN 101 using a connection port 120. Unauthorized AP 119 can be a malicious AP, a misconfigured AP, or a soft AP. A malicious AP can be an AP operated by a person having physical access to the facility and connected to LAN 101 without the permission of a network administrator. A misconfigured AP can be an AP allowable by the network administrator, but whose configuration parameters are, usually inadvertently, incorrectly configured. Note that an incorrect configuration can allow intruders to wirelessly connect to the misconfigured AP (and thus to LAN 101). A soft AP typically refers to a WiFi-enabled computer system connected to a connection port, but also functioning as an AP under the control of software. The software can be either deliberately run on the computer system or inadvertently run in the form of a virus program. Notably, the unauthorized APs create unauthorized wireless connection points on the LAN.

Unauthorized AP 119 may pose any number of security risks. For example, unauthorized AP 119 may not employ the right security policies or may bypass security policy enforcing elements, e.g., switch 114. Moreover, an intruder, such as unauthorized station 126 can connect to LAN 101 and launch attacks through unauthorized AP 119 (e.g., using the radio signal spillage of the unauthorized AP outside the region of operation of the LAN).

In one embodiment, an AP (e.g., unauthorized AP 119) delivers data packets between the wired LAN segment and the wireless medium. The AP can perform this function by acting as a NAT (i.e., network address translator). The NAT AP acts as a layer 3 router that routes IP packets received on its wired interface to the stations connected to its wireless interface and vice versa. The wired side and wireless side interfaces of the NAT AP are thus usually part of different subnets. The NAT AP further performs translation of IP addresses and port numbers in the packets before transferring them between the wired LAN segment and the wireless medium. The NAT functionality is described in the 'RFC 3022' specification of the Internet Engineering Task Force (IETF).

FIG. 1 also shows another unauthorized AP 121 whose radio coverage spills into the region of operation the concerned LAN. According to a specific embodiment, the AP 121 can be an AP in the neighboring office that is connected or unconnected to the neighbor's LAN, an AP on the premises of LAN 101 that is not connected to the LAN 101 and other APs, which co-exist with the LAN and share the airspace without any significant and/or harmful interferences. According to another specific embodiment, the AP 121 can be hostile AP. Notably, even though not connected to LAN 101, unauthorized AP 121 may lure authorized stations into communicating with it, thereby compromising their security. The hostile AP may lure authorized wireless stations into connecting to it and launch man-in-the-middle, denial of service, MAC spoofing and other kinds of disruptive attacks.

In accordance with one aspect of the invention, a security monitoring system can protect LAN 101 from unauthorized access (i.e., unauthorized AP or unauthorized station). The intrusion detection system can include one or more RF sensor/detection devices (e.g., sensor devices 122A and 122B, each generically referenced herein as a sniffer 122) disposed within or in a vicinity of a selected geographic region comprising at least a portion of LAN 101. In one embodiment (shown in FIG. 1), sniffer 122 can be connected to LAN 101 via a connection port (e.g., connection port 123A/123B). In another embodiment, sniffer 122 can be connected to LAN 101 using a wireless connection.

A sniffer 122 is able to monitor wireless activity in a subset of the selected geographic region. Wireless activity can include any transmission of control, management, or data packets between an AP and one or more wireless stations, or among one or more wireless stations. Wireless activity can even include communication for establishing a wireless connection between an AP and a wireless station (called "association").

In general, sniffer 122 can listen to a radio channel and capture transmissions on that channel. In one embodiment, sniffer 122 can cycle through multiple radio channels on which wireless communication could take place. On each radio channel, sniffer 122 can wait and listen for any ongoing transmission. In one embodiment, sniffer 122 can operate on multiple radio channels simultaneously.

Whenever a transmission is detected, sniffer 122 can collect and record the relevant information about that transmission. This information can include all or a subset of information gathered from various fields in a captured packet. Other information such as the size of the packet and day and time when the transmission was detected can also be recorded.

In one embodiment, the unauthorized AP (e.g., AP 119) uses encryption on the wireless link. That is, it can allow a colluding client (e.g., such as intruder 126) to connect to it. Additionally, the wireless communication between the unauthorized AP and the colluding intruder can be encrypted, making it difficult for sniffer 122 to decipher the information in the captured wireless activity associated with this communication.

Figure 2:
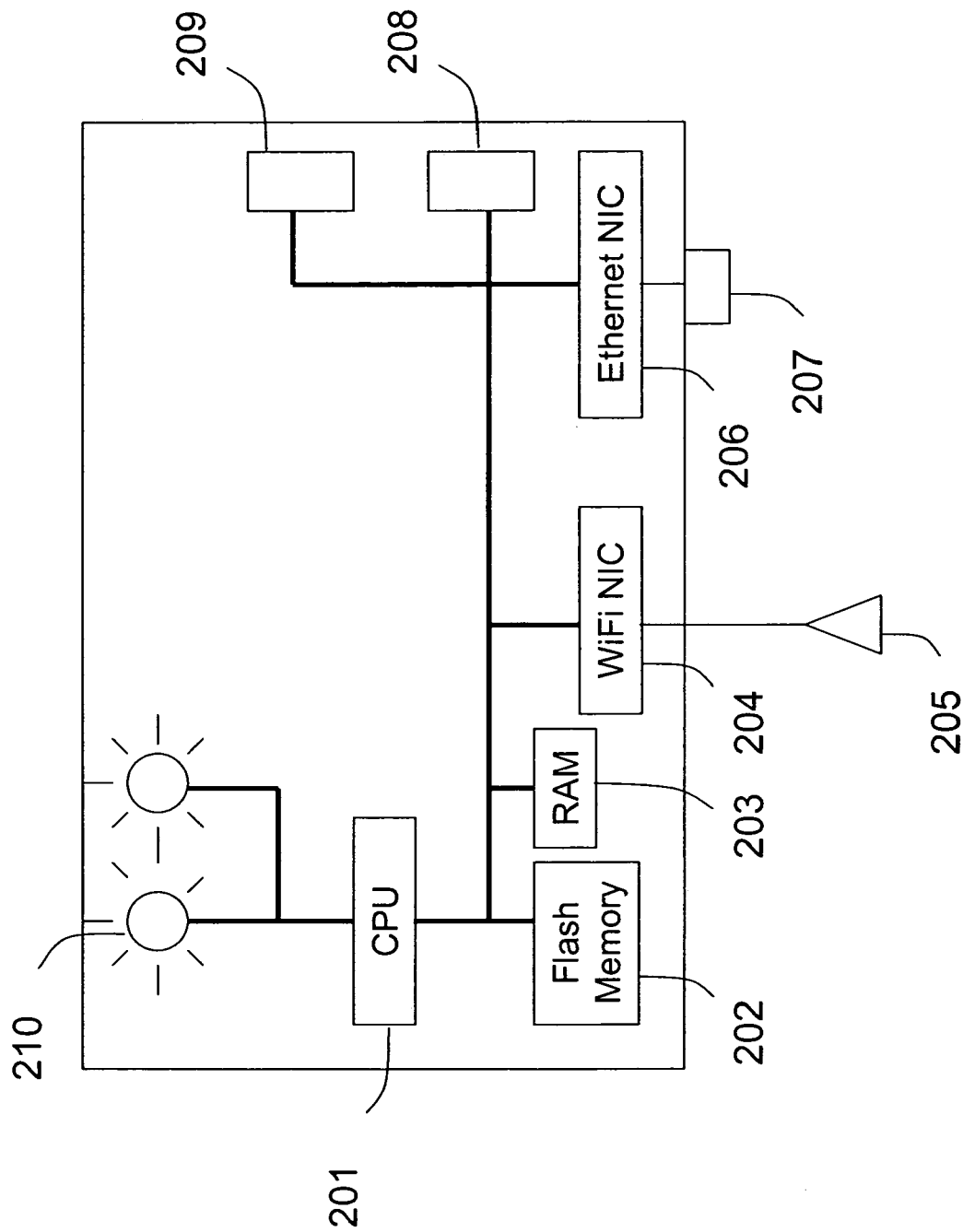
FIG. 2 illustrates an exemplary hardware diagram of a sniffer device according to an embodiment of the present invention.

In one embodiment, sniffer 122 can be any suitable receiving device capable of detecting wireless activity. An exemplary hardware diagram of the sniffer is shown in FIG. 2. This diagram is merely an example, which should not unduly limit the scope of the claims herein. One of ordinary skill in the art would recognize many variations, alternatives, and modifications. As shown, in order to provide the desired detection and recording functionality, sniffer 122 can have a central processing unit (CPU) 201, a flash memory 202 where the software code for sniffer functionality resides, and a RAM 203 which serves as volatile memory during program execution. The sniffer 122 can have one or more 802.11 wireless network interface cards (NICs) 204 which perform radio and wireless MAC layer functionality and one or more of dual-band (i.e., for transmission detection in both the 2.4 GHz and 5 GHz radio frequency spectrums) antennas 205 coupled to the wireless NICs. Each of the wireless NICs 204 can operate in a, b, g, b/g or a/b/g mode. Moreover, the sniffer 122 can have an Ethernet NIC 206 which performs Ethernet physical and MAC layer functions, an Ethernet jack 207 such as RJ-45 socket coupled to the Ethernet NIC for connecting the sniffer device to wired LAN with optional power over Ethernet or POE, and a serial port 208 which can be used to flash/configure/troubleshoot the sniffer device. A power input 209 is also provided. One or more light emitting diodes (LEDs) 210 can be provided on the sniffer device to convey visual indications (such as device working properly, error condition, unauthorized wireless device alert, and so on).

In one embodiment, sniffer 122 can be built using a hardware platform similar to that used to build an AP, although having different functionality and software. In one embodiment, to more unobtrusively be incorporated in the defined geographic region, sniffer 122 could have a small form factor. In one embodiment, a sniffer 122 could also be provided with radio transmit interface, thereby allowing sniffer 122 to generate interference with a suspected intruder's transmission. The radio transmit interface could also be used by the sniffer 122 for active probing which involves transmission of test signals.

A sniffer 122 can be spatially disposed at an appropriate location in the selected geographic region by using heuristics, strategy, and/or calculated guesses. In accordance with one aspect of the invention, an RF (radio frequency) planning tool can be used to determine an optimal deployment location for sniffer 122.

Server 124 (also called "security appliance") can be coupled to LAN 101 using a connection port 125. In one embodiment, each sniffer 122 can convey its information about detected wireless activity to server 124 (i.e., over one or more computer networks). Server 124 can then analyze that information, store the results of that analysis, and process the results. In another embodiment, sniffer 122 may filter and/or summarize its information before conveying it to server 124.

Sniffer 122 can also advantageously receive configuration information from server 124. This configuration information can include, for example, the operating system software code, the operation parameters (e.g., frequency spectrum and radio channels to be scanned), the types of wireless activities to be detected, and the identity information associated with any authorized wireless device. Sniffer 122 may also receive specific instructions from server 124, e.g., tuning to specific radio channel or detecting transmission of specific packet on a radio channel.

According to an aspect of the present invention, the intrusion detection system can classify the APs into three categories: authorized, rogue and external. An "authorized AP" refers to the AP allowed by the network administrator (e.g., APs 113A, 113B and 116), a "rogue AP" refers to the AP not allowed by the network administrator, but still connected to the LAN to be protected (e.g., AP 119), and an "external AP" refers to the AP not allowed by the network administrator, but not connected to the LAN to be protected (e.g., AP 121). For example, the external AP can be neighbor's AP connected to neighbor's network.

Figure 3:
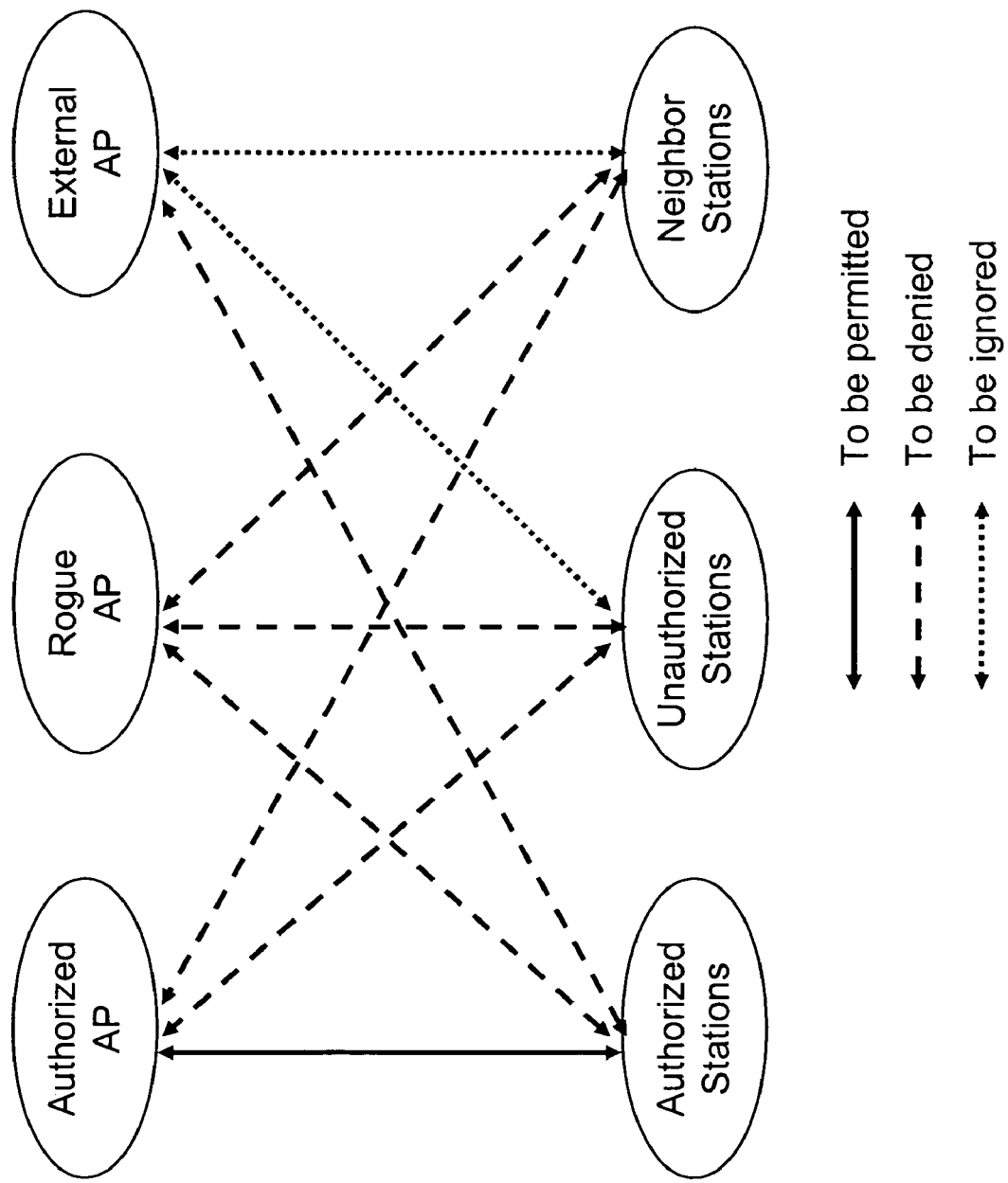
FIG. 3 illustrates an exemplary security policy according to an embodiment of the present invention.

Advantageously, a security policy can be enforced using the foregoing AP classification. For example, wireless communication between an authorized wireless station (e.g., stations 118) and the authorized AP is to be permitted, according to a security policy. The wireless communication between an unauthorized/neighbor's wireless station (e.g., station 126) and the external AP is to be ignored, according to a security policy. Advantageously, the ignoring eliminates false alarms regarding security policy violation and removes nuisance factor from the operation of the intrusion detection system. All other wireless communication (e.g., between an authorized/unauthorized/neighbor's wireless station and the rogue AP, between an authorized wireless station and the external AP, etc.) is to be denied, according to a security policy of an embodiment in the present invention. Advantageously, the denying helps protect the integrity of the LAN and the authorized wireless stations. The aforementioned security policy is illustrated in FIG. 3. This diagram is merely an example, which should not unduly limit the scope of the claims herein. One of ordinary skill in the art would recognize many variations, modifications, and alternatives.

In one embodiment, the invention provides a method for determining if a selected AP is coupled to the LAN. This can facilitate the foregoing AP classification. The method includes transferring one or more test packets called 'marker packets' over the LAN to a selected device that is suspected to be an AP. The marker packet can be a layer 2 packet, a TCP packet, a UDP packet, an ICMP packet, an ARP packet, or any other packet in IP or any other format. Preferably, marker packets have selected format. In one embodiment, the marker packets can be of selected one or more sizes. In another embodiment, the marker packets can have selected bit pattern in them. In yet another embodiment, the marker packets have associated with them selected time instants related to their transferring over the LAN.

If the selected device is coupled to the LAN, it receives one or more of the marker packets. Further if it is an AP, it outputs at least a subset of the received packets over the wireless medium, possibly after some processing and modification to the packets. Thus if a sniffer detects transmission of one or more packets associated with the marker packets from an AP over the wireless medium, said AP is inferred to be coupled to the LAN.

However, transferring marker packets over the LAN so that they can be output by the AP over the wireless medium is non-trivial using conventional techniques. This is partly because the AP devices often implement NAT functionality. A NAT AP can output packets from the wired to wireless side only if the corresponding port mapping exits in the AP device, else the AP discards the packets. In one embodiment, the port mapping is created when the client wireless station of the AP initiates a communication session (e.g., TCP or UDP session) to some device (e.g., web server, email server, database, another host, etc.) connected to the network on the wired side of the NAT AP. Without the knowledge of this port mapping, marker packets cannot be transferred to be output through NAT APs.

In some embodiments, the AP devices can use encryption on the wireless link. For example, the unauthorized AP (e.g., AP 119) can use encryption on the wireless link. That is, it can allow a colluding client (e.g., such as intruder 126) to connect to it. Additionally, the wireless communication between the unauthorized AP and the colluding intruder can be encrypted, making it difficult for sniffer 122 to decipher the information in the captured wireless activity associated with this communication. This makes it difficult for the sniffer to learn about the port mapping as this information cannot be derived from the captured encrypted wireless communication. Encryption on the wireless link also makes it difficult for the sniffer 122 to identify packets captured on the wireless link as associated with marker packets.

Figure 4A:
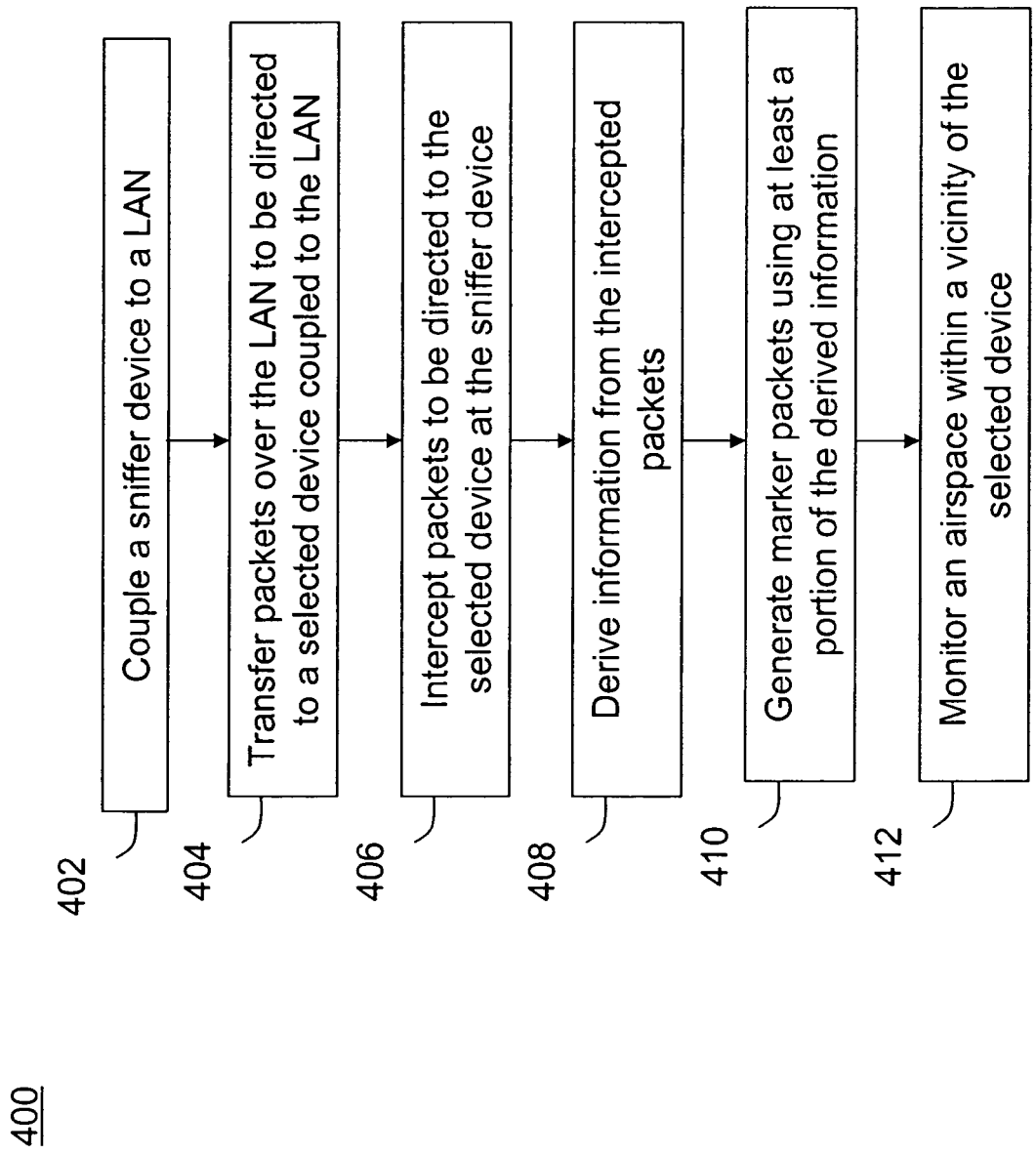
FIG. 4A illustrates a simplified method for detecting wireless access devices coupled to local area network according to an embodiment of the present invention.

In one embodiment, the present invention provides a method that can overcome the foregoing obstacles. This method 400 for detecting wireless access devices coupled to a LAN is illustrated in FIG. 4A. This diagram is merely an example, which should not unduly limit the scope of the claims herein. One of ordinary skill in the art would recognize many variations, alternatives, and modifications. The method 400 can advantageously detect NAT APs coupled to LAN, even if the APs use encryption on wireless link.

Figure 4B:
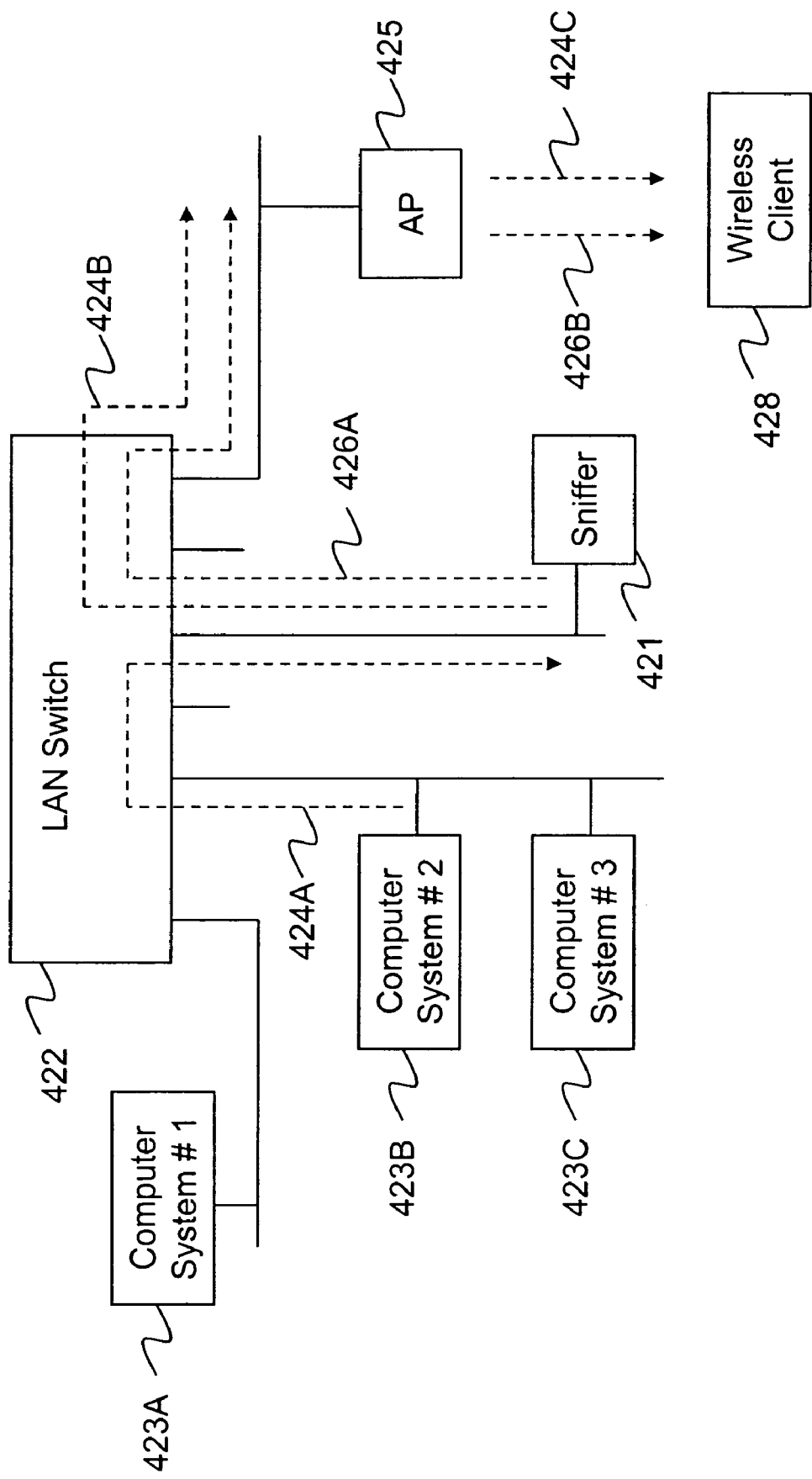
FIG. 4B illustrates a simplified interconnection of network components according to an embodiment of the present invention.

As shown, step 402 can couple a sniffer device to a LAN. In one embodiment (e.g., illustrated in FIG. 4B), the sniffer device is connected to a network segment of the LAN to be protected from unauthorized access. FIG. 4B illustrates a network segment of a LAN formed using LAN switch 422. This diagram is merely an example, which should not unduly limit the scope of the claims herein. One of ordinary skill in the art would recognize many variations, alternatives, and modifications. As shown in FIG. 4B, the network segment can comprise computer systems 423A, 423B and 423C. Moreover, the network segment is shown to comprise a NAT AP 425. A sniffer 421 is shown connected to this network segment. In one embodiment, the sniffer can be connected using wires (e.g., Ethernet connection). In another embodiment, the sniffer can be connected using wireless link (not shown). In yet another embodiment, a software directed to perform sniffer functionality can be run on one more of the computer systems (e.g., 423A, 423B, 423C etc.) connected to the network segment.

Step 404 can transfer one or more packets to be directed to a selected device over the local area network, the selected device being coupled to the local area network. As merely an example, in FIG. 4B the one or more packets can be transferred from the computer system 423B to be directed to AP 425. In one embodiment, the ultimate destination of these packets can be a wireless client 428.

Step 406 can intercept the one or more packets to be directed to the selected device at the sniffer device. In one embodiment, the intercepting comprises routing the one or more packets to be directed to the selected device through the sniffer device. For example, as shown in FIG. 4B, packets 424A to be directed to AP 425 are intercepted at the sniffer 421. Step 408 can derive information from the intercepted one or more packets using the sniffer device. In one embodiment, the derived information comprises destination port type (TCP or UDP) and destination port number in the intercepted packets. In one embodiment, the sniffer can transfer the intercepted one or more packets to the selected wireless device (as shown by 424B) after deriving information from them. The selected wireless device can transfer these packets to their destination after possibly processing and modifying them (as shown by 424C).

Step 410 can generate one or more packets in a selected format (generically called 'marker packets' throughout this specification) based upon at least a portion of the derived information using the sniffer. Preferably, the generated packets are of the same type (TCP or UDP) and destined to the same port number as inferred in step 408. Step 410 can transfer the marker packets from the sniffer over the local area network to the selected device. This is illustrated by 426A in example of FIG. 4B. In one embodiment, the selected format can comprise a selected size or a set of selected sizes. In another embodiment, the selected format can comprise a selected bit pattern or a set of selected bit patterns. In yet another embodiment, the selected format can comprise a set of time instants associated with packet generation, a set of time instants associated with packet transfer, etc.

Step 412 can monitor an airspace within a vicinity of the selected device using one or more sniffer devices. In one embodiment (illustrated in FIG. 4B), the selected device is a wireless access device (e.g., NAT AP 425). Since the marker packets 426A are destined to the port number for which a port mapping is inferred to exist in the AP 425 (e.g., in step 408), the AP 425 routes the packets 426A to the wireless link so that they can be delivered to their destination (e.g., wireless client 428) as shown by 426B. The packets 426B will often exhibit format (e.g., size, bit pattern, time instant associated with start/end of transmission, etc.) associated with the selected format of the marker packets. At least one of the one or more sniffer devices (e.g., sniffer 421 in FIG. 4B) can detect at least one of the packets 426B. This closes the loop and the device 425 can be inferred to be a wireless access device connected to the network segment. On the other hand, if the selected device is not a wireless access device (not shown in FIG. 4B), the marker packets 426A would not be routed to the wireless link. Notably, in one embodiment the sniffer device that transfers marker packets in step 410 and the one that detects packets associated with the marker packets on wireless link in step 412 can be the same sniffer device. In an alternative embodiment, the sniffer device that transfers marker packets in step 410 and the one that detects packets associated with the marker packets on wireless link in step 412 can be different sniffer devices (not shown in FIG. 4B).

In one embodiment of method 400, the sniffer device may not generate new marker packets (e.g., as in step 408), rather use the intercepted packets as marker packets. The sniffer can transfer the intercepted one or more packets to the selected device after deriving format information (e.g., size, bit pattern, time instant associated with packet transfer from the sniffer, etc.) from them, as shown by 424B in FIG. 4B. Step 412 can then monitor the airspace and compare format information in the packets detected on the wireless link with the format information derived from the intercepted one or more packets in step 408. If the selected device is a wireless access device (e.g., NAT AP 425), the marker packets 424B will be routed to their destination (e.g., wireless client 428) as shown by 424C. The packets 424C on wireless link can be detected by the sniffer device (e.g., sniffer 421).

The above sequence of steps provides method according to an embodiment of the present invention. As shown, the method uses a combination of steps including a way of detecting for an intrusion using wireless computer networks. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 5:
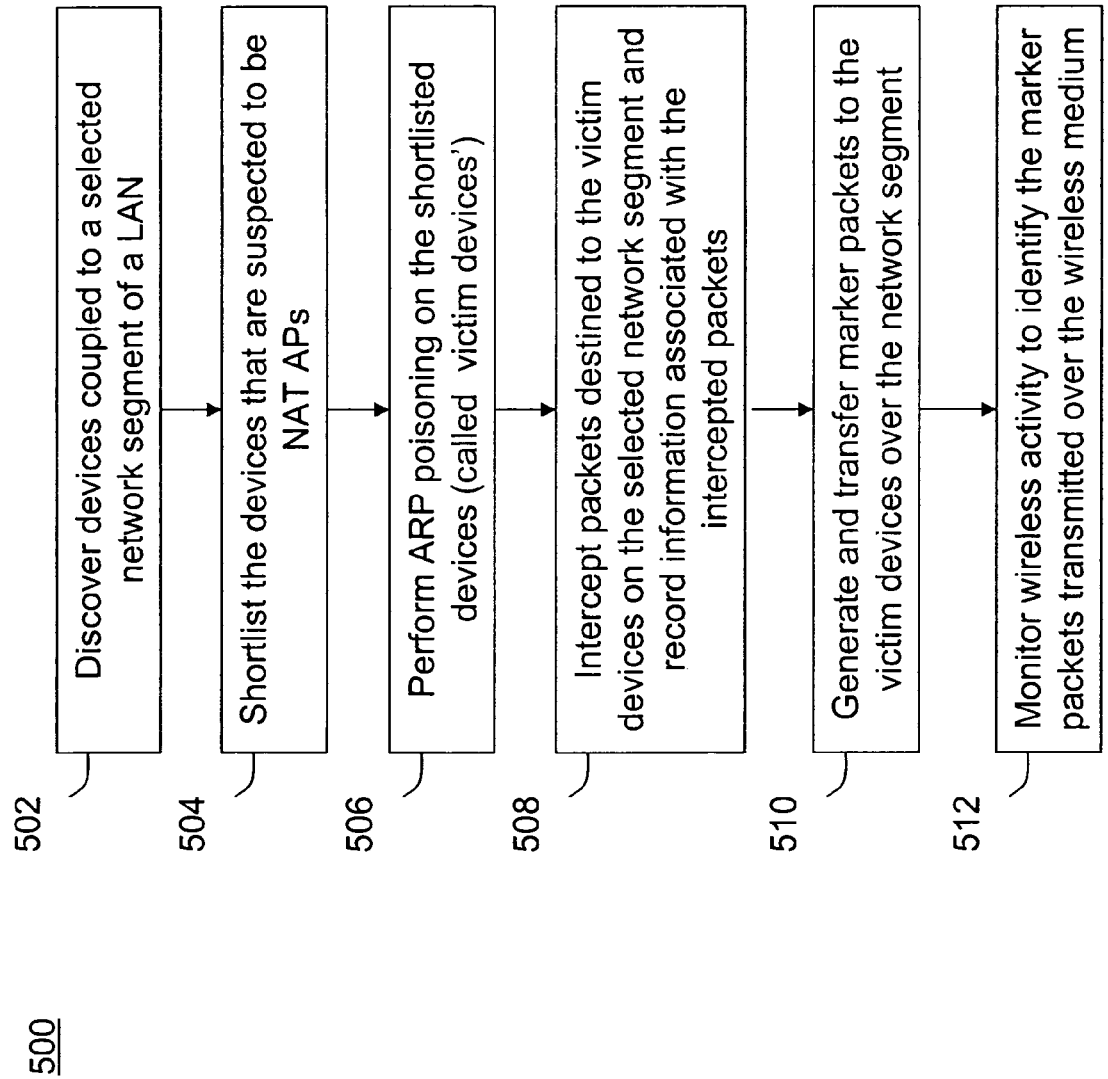
FIG. 5 illustrates a simplified method for detecting connectivity of wireless access points to local area network according to a specific embodiment of the present invention.

The method 500 according to a specific embodiment of the method of invention is illustrated in FIG. 5. This diagram is merely an example, which should not unduly limit the scope of the claims herein. One of ordinary skill in the art would recognize many variations, modifications, and alternatives.

As shown, step 502 can discover a set of devices coupled to a selected network segment of a local area network. In a specific embodiment, the IP numbers (i.e., IP addresses) and MAC addresses (e.g., Ethernet addresses) of these devices are determined. In another specific embodiment, software tools such as "ettercap", "nmap" and others can be used for this purpose. These tools can scan (for example, using ICMP ping packets, TCP SYN packets, etc.) the IP addresses within the address range of the network segment to detect active IP addresses on the segment. They can then perform ARP (Address Resolution Protocol as described in 'RFC 0826' specification of the IETF) query to determine the corresponding MAC addresses. In one embodiment, the tool software can be run on the sniffer device that is connected to the network segment.

Alternatively, the sniffer can capture (e.g., over the Ethernet connection) and analyze the ARP transactions on the network segment to infer the IP addresses of the devices attached to the segment. The ARP request is used by a requester device to query the MAC address corresponding to a given IP address and is a broadcast message on the network segment. The ARP reply is sent to the requester by the device that owns the given IP address. The ARP reply is usually a unicast message to the requester and contains the MAC address of the responder. In one specific embodiment, the sniffer can capture ARP request packets on the network segment. The ARP request packet contains IP address of the requester. The sniffer can then issue the ARP query for this IP address and find out the corresponding MAC address.

Step 504 can shortlist the devices that are suspected to be NAT APs from the discovered set of devices. In one embodiment, NAT devices from the discovered set are identified by conducting certain tests. For example, one or more IP packets are transferred (e.g., by the sniffer) to the network segment with TTL (Time To Live) value in IP header set equal to 1 and the response is monitored. In a specific embodiment, the IP packet is addressed to arbitrary IP address and is transferred to the network segment as Ethernet broadcast packet (e.g., Ethernet destination address of hexadecimal FF:FF:FF:FF: FF:FF). Preferably, the NAT devices reply to this packet via ICMP "Time Exceeded" message. While host devices (e.g., PCs/laptops running Microsoft windows, Linux, etc.) and server devices (e.g., mail server, WWW server, file transfer server, etc.) do not send any response.

In an alternative embodiment to identify NAT devices, one or more IP packets addressed to a selected IP address (e.g., among the discovered list in step 502) and a selected UDP port is transferred by the sniffer to the LAN segment and the response is monitored. Preferably, the selected UDP port number is chosen to be from the range that is not typically used by UDP based applications (e.g., greater than 61,000). Preferably, the NAT device (i.e., with the selected IP address) does not send any ICMP reply to this packet. While the other devices (i.e., with the selected IP address) respond with ICMP "Destination Unreachable" message.

In yet an alternative embodiment to identify NAT devices, one or more IP packets addressed to a selected IP address (other than that of a selected victim device) are transferred by the sniffer over the LAN segment to the selected victim device (e.g., to the MAC address of the selected victim device). Preferably, if the selected victim device is a NAT device, it forwards these packets to their appropriate IP destination. If not, it simply discards the packets. Thus, the arrival or otherwise of these packet at their correct IP destination can indicate if the victim device is a NAT device or not.

In yet a further alternative embodiment, the information received during the DHCP (Dynamic Host Configuration Protocol described in 'RFC 2131' of the IETF) transactions is used for the shortlisting of the suspected NAT AP devices. In a specific embodiment, the sniffer obtains IP address for itself by issuing DHCP query, and in response, receives IP address and configuration parameters (e.g., IP addresses of one or more gateway routers). Notably, the gateway routers can also often provide NAT functionality. Since preferably APs are not gateway routers, this test helps identifying NAT devices in the discovered set that are most likely not AP devices.

In another alternative embodiment, the sniffer prepares a list of MAC addresses of one or more APs discovered from the packets captured on the wireless medium (e.g., from the source MAC addresses found in captured beacon packets). It then looks for MAC addresses in the discovered set (e.g., in step 502) that are within a small margin (e.g., plus or minus 1, plus or minus 2, etc.) of at least one of the MAC addresses discovered on the wireless medium. If such MAC addresses are found in the discovered set, the corresponding devices can be added to the set of suspected NAP APs. This is because preferably the AP equipment manufacturers often configure MAC addresses on the wireless interface (e.g., WiFi NIC) and the wired interface (e.g., Ethernet NIC) that are within a small margin of each other. In another embodiment, the sniffer compares vendor information derived from the MAC addresses (e.g., from the three bytes in the MAC address that often contain vendor identification number) to determine suspected APs among the discovered set (e.g., in step 502). In one preferred embodiment, both the wireless and wired NICs on an AP device are provided by the same vendor. In another preferred embodiment, only a known set of vendors provides (i.e., sells in the market) the AP equipment.

Step 506 can perform "ARP poisoning" directed to one or more devices (called "victim devices") detected on the network segment (e.g., in step 502). Preferably, victim devices are chosen from the shortlisted (e.g., as in step 504) set of devices. This can advantageously spare from ARP poisoning the devices connected to the network segment that are most likely not the NAT AP devices. The ARP poisoning involves sending ARP reply (usually unsolicited) from the sniffer advertising the sniffer's own MAC address as associated with the victim device's IP address. In one embodiment, the ARP reply is addressed to a broadcast address on the network segment. In an alternative embodiment, the ARP reply is unicast to each of the devices detected on the network segment, except the victim device. Other techniques to perform ARP poisoning can also be used. The sniffer can ARP poison one or more victims devices at any given time.

As a result of ARP poisoning, the devices connected to the network segment register the association between the victim device's IP address and the sniffer's MAC address. Consequently, when any device on the network segment wants to transfer IP packet to the victim device's IP address, it forwards it to the sniffer's MAC address and thus sniffer gets the packet first. The sniffer captures this packet and records information associated with the packet. This is illustrated in step 508.

In one embodiment, the recorded information can include the value of destination port in the UDP/TCP header of the packet. This value can be indicative of the port number in the victim device for which a port mapping entry has been created by the client wireless station. That is, if packets are sent to this port number on the victim device, the victim device is able to route them over the wireless link to the client wireless station. In another embodiment, size of the packet can be recorded. In yet an alternative embodiment, other contents in the packet header and payload can be recorded.

The sniffer can relay this packet to the victim device's MAC address, which is its legitimate destination on the network segment. If the victim device is indeed a NAT AP and if the packet is destined to a client wireless station connected to this NAT AP, the victim device can then route this packet to the client wireless station using the port mapping information available in the victim device. In one embodiment, the sniffer fragments (e.g., as in IP packet fragmentation described in 'RFC 0791' specification of the IETF) the victim's packets and forwards one or more fragments to the victim device after storing information associated with the fragments. The fragmentation preferably renders specific characteristics (e.g., sizes) to fragments for ease of their later identification. Additionally, the fragment sizes can be chosen from a predetermined set. This enables a sniffer to identify a marker packet on the wireless medium, which is intercepted (e.g., after ARP poisoning) and forwarded by another sniffer.

As shown in step 510, the sniffer can generate one or more marker packets and transfer these packets on the network segment to the victim device. The information recorded from the earlier captured victim device's packet (e.g., as in step 508) can be used in generating these marker packets. In one embodiment, the marker packets can be generated addressed to UDP/TCP port inferred from the earlier captured packet. Preferably, whenever the sniffer switches to a new radio channel for monitoring wireless activity, one or more marker packets are generated and transferred to the victim device. This advantageously increases the chance of detecting packets associated with the marker packets on the wireless medium. These marker packets will be received by the victim device, and if it is a NAT AP, will be routed by the victim device on the wireless medium to their destination using the port mapping information available in the victim device.

Notably, in a specific embodiment, the UDP/TCP marker packets generated by the sniffer contain null payload. In another specific embodiment, the TCP header and payload in the marker packets generated by the sniffer can be the same as those in the earlier captured packet. In yet another specific embodiment, UDP/TCP packets are generated with a non-null payload but with an incorrect value of the CRC or Cyclic Redundancy Checksum (e.g., in the UDP or TCP checksum field), so that eventually they will be rejected by the recipient device (e.g., client wireless station). Techniques such as these can advantageously avoid confusing or disrupting the UDP/TCP application on the client wireless station due to the packets generated by the sniffer. In one embodiment, the sniffer can generate packets having sizes selected from a predetermined set of sizes for ease of their later identification. This can also enable a sniffer to identify marker packets on the wireless medium, which are generated by other sniffers. Other embodiments of packet generation are possible and will be apparent to those skilled in the art.

As shown in step 512, the sniffer can monitor wireless transmissions and identify marker packets. In one embodiment, the characteristics (content, header values, sizes, etc.) of packets detected by the sniffer over the wireless medium are examined. The examination reveals if any packet or a fragment of a packet earlier transferred by the sniffer or another sniffer to the network segment has appeared on the wireless medium. If the match is detected, the AP that transmits said packet or fragment on the wireless link is inferred to be connected to the LAN segment.

In one embodiment, once the AP is inferred to be connected to the LAN segment, subsequent tests for connectivity can be done using methods such as querying the AP over the LAN segment. For example, ARP requests are periodically sent (e.g., by the sniffer) to the AP's IP address. As long as the AP responds to these requests, it is inferred to be connected to the LAN segment. In one embodiment, when no response is received, the AP is inferred to be disconnected from the LAN segment.

The above sequence of steps provides method according to an embodiment of the present invention. As shown, the method uses a combination of steps including a way of detecting connectivity of NAT AP devices to wireless computer networks. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 6:
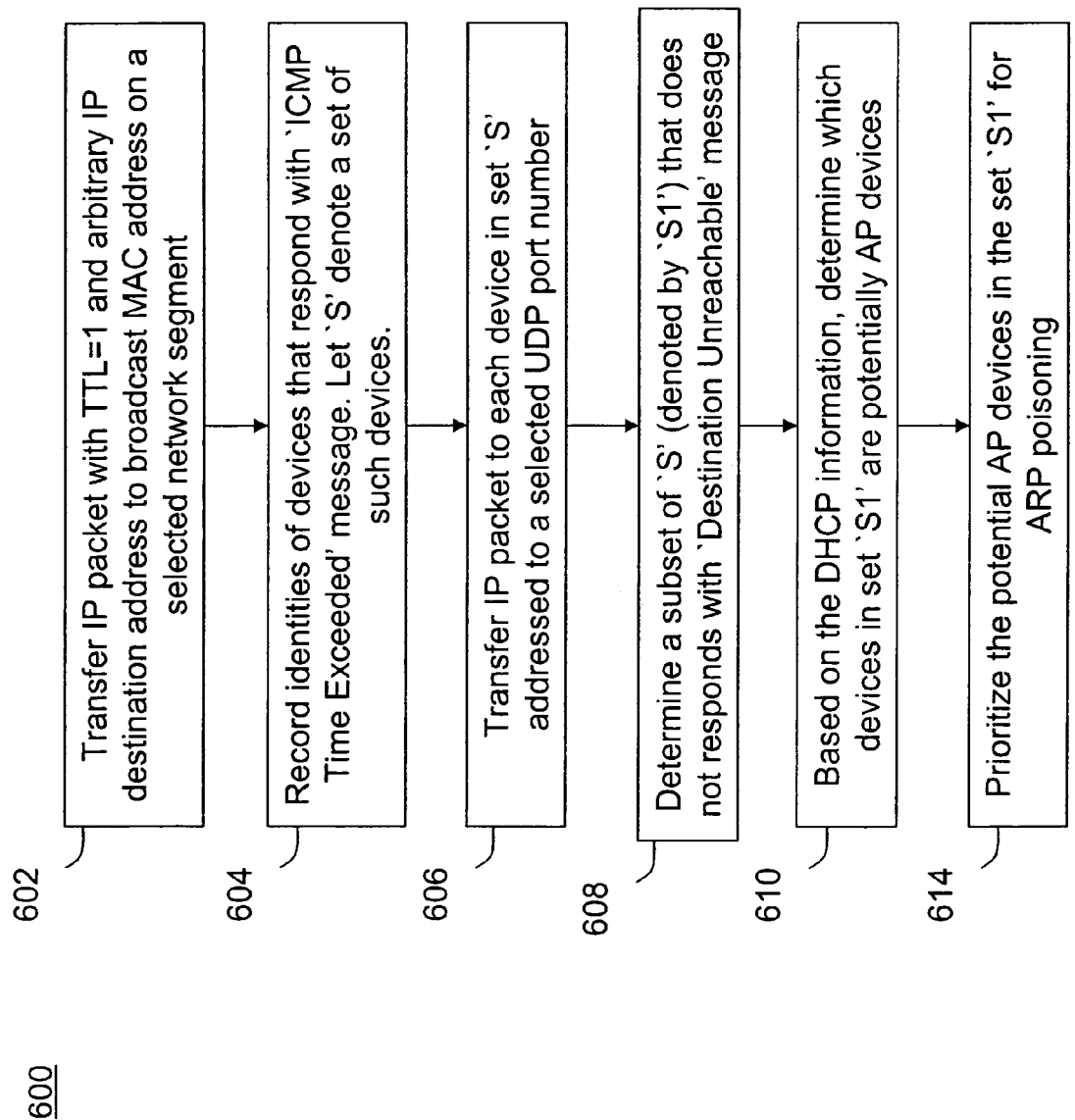
FIG. 6 illustrates a simplified method for short-listing suspected NAT APs according to a specific embodiment of the present invention.

The method 600 for shortlisting suspected NAT APs according to a specific embodiment of the method of invention is illustrated in FIG. 6. This diagram is merely an example, which should not unduly limit the scope of the claims herein. One of ordinary skill in the art would recognize many variations, modifications, and alternatives. This method 600 can be used for step 504. The steps in method 600 are as follows.

Step 602 can transfer, over a selected network segment, one or more IP packets each with TTL filed value of 1 and arbitrary IP destination address. Preferably, the packets are sent to a MAC broadcast address of the network segment. Step 604 can record identities of devices that respond with 'ICMP Time Exceeded' message. In one embodiment, the identities can include MAC and/or IP addresses of the devices. Let 'S' denote a set of such devices. In one embodiment, the set 'S' includes NAT and router devices connected to the network segment.

Step 606 can transfer one or more IP packets over the network segment to each device in the set 'S'. In one embodiment, these are UDP packets addressed to some high number (e.g., 60,000) UDP port. Step 608 can determine a subset of 'S' (denoted by 'S1') that do not respond with 'Destination Unreachable' message. Preferably, the set 'S1' includes NAT devices connected to the network segment. In one embodiment, the messages in steps 602 and 606 are sent from the Ethernet interface of a sniffer device that is connected to the network segment. The responses in steps 604 and 608 can be monitored by the same sniffer or different sniffer.

Step 610 can determine based on DHCP information, which devices in the set 'S1' are potentially AP devices. For example, the DHCP response often includes identities of gateway routers that are connected to the network segment. Gateway routers can often implement NAT functionality; however gateway routers preferably are not AP devices.

Step 612 can prioritize the potential AP devices in the set 'S1' for ARP poisoning. In one embodiment, a sniffer can prepare a list of MAC addresses of one or more APs discovered from the packets captured on the wireless medium (e.g., from the source MAC addresses found in captured beacon packets). It then looks for MAC addresses among the potential AP devices in set 'S1' that are within a small margin (e.g., plus or minus 1, plus or minus 2, etc.) of at least one of the MAC addresses discovered on the wireless medium. If such MAC addresses are found in the discovered set, the corresponding devices can be prioritized for ARP poisoning. This is because preferably the AP equipment manufacturers often configure MAC addresses on the wireless interface (e.g., WiFi NIC) and the wired interface (e.g., Ethernet NIC) that are within a small margin of each other. In another embodiment, the sniffer compares vendor information derived from the MAC addresses (e.g., from the three bytes in the MAC address that often contain vendor identification number) to prioritize the potential AP devices for ARP poisoning. In one preferred embodiment, both the wireless and wired NICs on an AP device are provided by the same vendor. In another preferred embodiment, only a known set of vendors provides (i.e., sells in the market) the AP equipment.

The above sequence of steps provides method according to an embodiment of the present invention. As shown, the method uses a combination of steps including a way of short-listing NAT AP devices coupled to local area network segment. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 7:
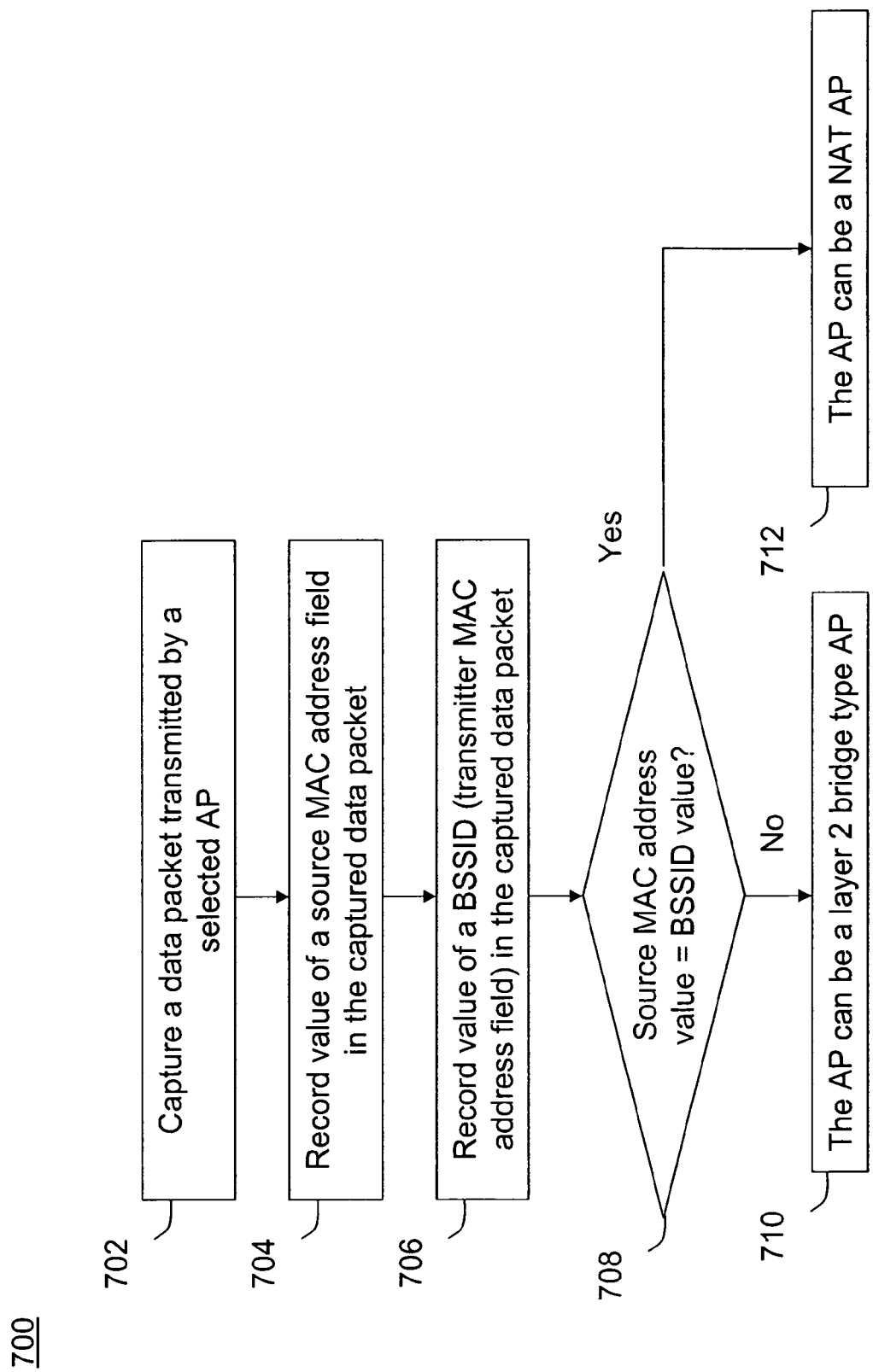
FIG. 7 illustrates a simplified method for identifying NAT APs from MAC address information in the packets over the wireless link according to a specific embodiment of the present invention.

In one embodiment of the invention, presence of NAT AP in the LAN is inferred by monitoring specific wireless activity associated with the APs. This embodiment can infer whether an AP is a NAT AP by analyzing MAC addresses in data packets over the wireless medium transmitted by or destined to the AP. For example, the source (destination) MAC address in a data packet (e.g., 802.11 data frame) transmitted over the wireless medium by a NAT AP (to a NAT AP) is always equal to the BSSID of the AP. On the other hand, the source (destination) MAC address in a data packet transmitted over the wireless medium by a layer 2 bridge AP (to layer 2 bridge AP) is often different from the BSSID of the AP. The method 700 according to this embodiment is illustrated in FIG. 7. This diagram is merely an example, which should not unduly limit the scope of the claims herein. One of ordinary skill in the art would recognize many variations, modifications, and alternatives. For example, this method can be used to determine if NAT APs are present in the LAN before performing other connectivity tests.

As shown, step 702 can capture a data packet over wireless medium transmitted by (destined to) a selected AP. Step 704 can record a source MAC address (destination MAC address) in the packet. Step 706 can record the BSSID value in the packet. For example, BSSID is the value in the transmitter address (receiver address) field of the captured packet. The source MAC address (destination MAC address) value is compared with the BSSID value in step 708. If the two values are not equal to each other, in step 710 the AP is inferred to be a layer 2 bridge type AP.

If the two values are equal to each other, in step 712 the AP is inferred to be a potential NAT AP. In a preferred embodiment, if a threshold number of packets indicate that the AP is a potential NAT AP, said AP is inferred to be a NAT AP. In an alternative preferred embodiment, if a threshold number of packets each associated with a different client wireless station communicating with the AP indicate that the AP is a potential NAT AP, said AP is inferred to be a NAT AP.

The above sequence of steps provides method according to an embodiment of the present invention. As shown, the method uses a combination of steps including a way of detecting NAT AP devices present in a local area network. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 8:
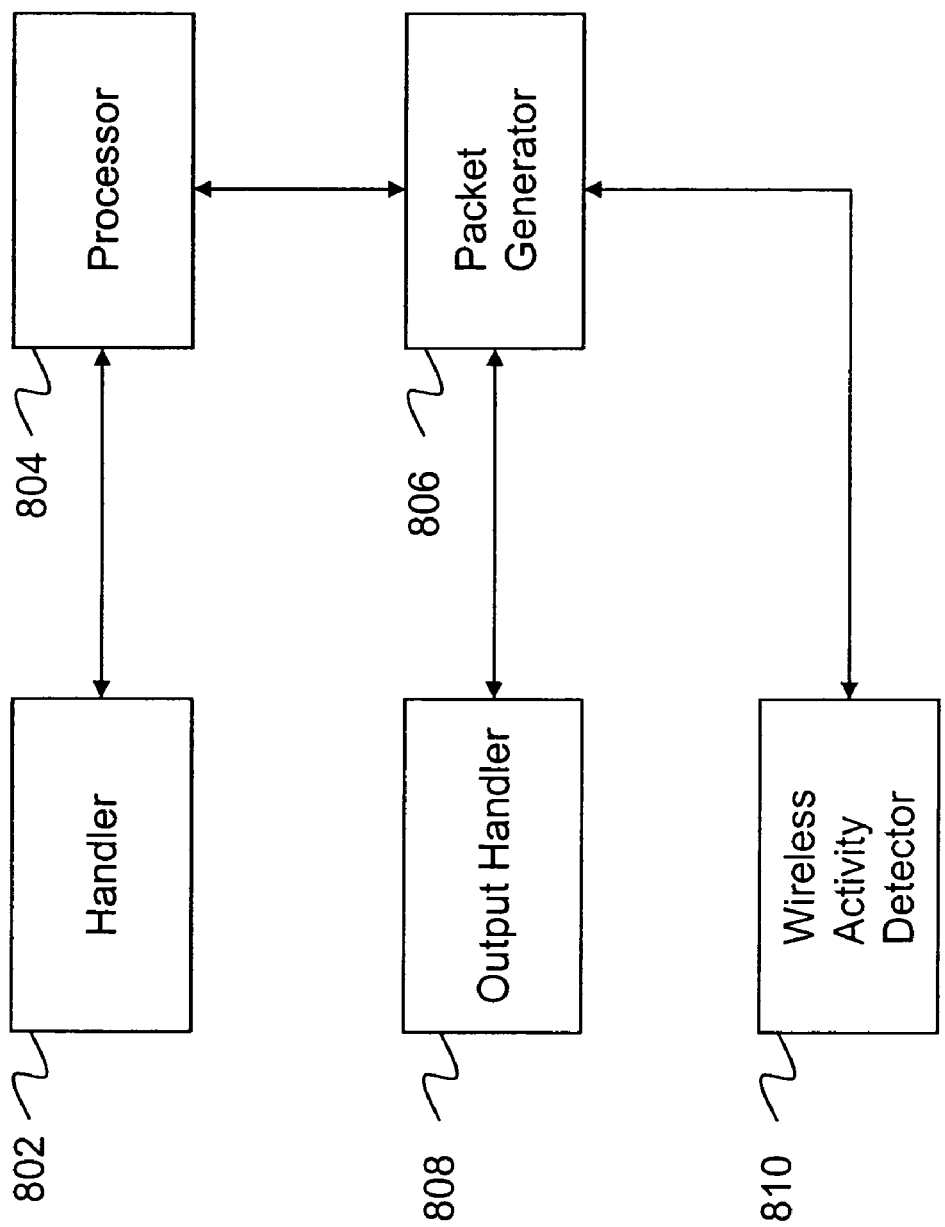
FIG. 8 illustrates a simplified functional diagram of a sniffer device according to an embodiment of the present invention.

FIG. 8 illustrates a simplified functional diagram of a sniffer device according to an embodiment of the present invention. As shown, the sniffer device comprises a handler 802, a processor 804, a packet generator 806 and an output handler 808. Each of these can be provided at least in part in one or more computer codes. The handler 802 is adapted to intercept one or more packets on a network segment. Preferably, the one or more packets are directed to be transferred to a selected device coupled to the network segment. In one embodiment, the handler intercepts the one or more packets using the Ethernet network interface (e.g., Ethernet NIC 206). In another embodiment, the handler intercepts the one or more packets using the wireless network interface (e.g., WiFi NIC 204). In one embodiment, the handler includes ARP poisoning function (e.g., as in step 506). In another embodiment, the handler includes short-listing function (e.g., as described in step 504, method 600, etc.).

The processor 804 is adapted to derive information associated with the intercepted one or more packets (e.g., as in step 408, step 508, etc.). The packet generator 806 is adapted to generate one or more packets in a selected format based upon at least a portion of the derived information (e.g., as in step 410, step 510, etc.). The output handler 808 is adapted to transfer the one or more packets in the selected format over the network segment to the selected device. In one embodiment, the output handler transfers the one or more packets in the selected format using the Ethernet network interface. In another embodiment, the output handler transfers the one or more packets in the selected format using the wireless network interface.

As shown, the sniffer device can also comprise a wireless activity detector 810, which is adapted to monitoring wireless activity within an airspace to identify one or more packets associated with the one or more packets in the selected format. In one embodiment, the wireless activity detector can capture packets over the wireless medium, derive format information from them and compare the derived format information with the selected format information in the generated and transferred one or more packets. The wireless activity detector can be provided at least in part in one or more computer codes and the wireless activity detector can monitor the wireless activity using wireless radio receiver.

The various embodiments of the present invention may be implemented as part of a computer system. The computer system may include a computer, an input device, a display unit, and an interface, for example, for accessing the Internet. The computer may include a microprocessor. The microprocessor may be connected to a data bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, jump drive and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer'. The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for monitoring wireless access to local area network of computers, the method comprising:

intercepting one or more packets over a wired portion of a local area network, the one or more packets being directed to a destination port on a selected device coupled to the wired portion of the local area network, the destination port being identified via a destination port number included in the one or more intercepted packets;

determining the destination port number from the intercepted one or more packets;

generating one or more packets in a selected format and being directed to the destination port on the selected device, the destination port being identified in the generated one or more packets via the destination port number determined from the intercepted one or more packets;

transferring the generated one or more packets over the wired portion of the local area network to the selected device, the transferring being for testing whether the selected device outputs at least one packet from the transferred one or more packets to a wireless medium within a vicinity of the selected device;

monitoring the wireless medium within the vicinity of the selected device; and inferring that the selected device is coupled to the wired portion of the local area network to provide wireless access to the wired portion of the local area network, the inferring being based in part upon the at least one packet from the transferred one or more packets being detected as outputted to the wireless medium.

2. The method of claim 1 wherein the intercepting the one or more packets comprising routing the one or more packets directed to the destination port on the selected device through another device coupled to the wired portion of the local area network.

3. The method of claim 2 wherein the intercepting comprising Address Resolution Protocol (ARP) poisoning, the ARP poisoning associating an IP address of the selected device with a MAC address of the another device.

4. The method of claim 1 wherein:

the intercepted one or more packets being Transmission Control Protocol (TCP) packets;

the destination port on the selected device being a TCP port on the selected device; and the generated one or more packets being TCP packets.

5. The method of claim 1 wherein:

the intercepted one or more packets being User Datagram Protocol (UDP) packets;

the destination port on the selected device being a UDP port on the selected wireless device; and the generated one or more packets being UDP packets.

6. The method of claim 1 wherein the selected format comprises a selected bit pattern in a packet.

7. The method of claim 1 wherein the selected format comprises a selected size of a packet.

8. The method of claim 1 wherein the selected format comprises a set of selected sizes associated with a set of one or more packets.

9. The method of claim 1 wherein the selected format comprises a set of selected bit patterns associated with a set of one or more packets.

10. The method of claim 1 wherein the selected format comprises a set of time instants associated with a set of packets.

11. The method of claim 10 wherein the set of time instants is associated with the transferring the one or more packets to the wired portion of the local area network.

12. The method of claim 1 wherein the intercepting the one or more packets over the wired portion of the local area network is performed using a first sniffer device coupled to the wired portion of the local area network.

13. The method of claim 12 wherein the monitoring the wireless medium within the vicinity of the selected device is performed using a second sniffer device.

14. The method of claim 13 wherein the second sniffer device is same as the first sniffer device.

15. The method of claim 13 wherein the second sniffer device is different from the first sniffer device.

16. The method of claim 15 wherein the first sniffer device and the second sniffer device are in communication with a server device.

17. The method of claim 1 wherein the monitoring the wireless medium within the vicinity of the selected device comprising:
    receiving one or more packets transmitted over the wireless medium; and
    processing the one or more packets received to identify the selected format in the one or more packets.

* * * * *